Feb. 15, 1927.

A. E. L. SCANES ET AL 1,617,500

SEALING GLAND

Filed Jan. 13, 1920

INVENTOR.
Arthur Edwin Leigh Scanes
Thomas Brighouse
BY David C. Davis
ATTORNEY

Patented Feb. 15, 1927.

1,617,500

UNITED STATES PATENT OFFICE.

ARTHUR EDWIN LEIGH SCANES, OF ASHTON-ON-MERSEY, AND THOMAS BRIGHOUSE, OF MANCHESTER, ENGLAND, ASSIGNORS, BY MESNE ASSIGNMENTS, TO WESTINGHOUSE ELECTRIC AND MANUFACTURING COMPANY, A CORPORATION OF PENNSYLVANIA.

SEALING GLAND.

Application filed January 13, 1920, Serial No. 351,179, and in Great Britain January 13, 1919.

This invention relates to liquid sealed glands for rotating shafts of the type in which a radial contact face on a flange or collar fast on the rotating shaft cooperates with another contact face formed on a member movably connected with the casing of the machine through which the shaft passes, a suitable sealing liquid, water for example, being introduced between said cooperating faces, through ports and passages in the member movably connected with the casing of the machine. One or more pistons formed on the movable member and adapted to slide in a cylinder or cylinders formed in the machine casing to which sealing liquid is also supplied provide for end play in the shaft, the cooperating faces of the gland being maintained in proper relative position by spring pressure.

It has been found with this type of gland that the cylinders and pistons are apt to wear with the result that the clearance increases necessitating the supply of an excessive amount of sealing liquid. The object of the present invention is to overcome this difficulty, and according thereto an annular buffer of suitable elastic material, such as rubber is employed to form a liquid tight joint between the fixed portion of the casing of the machine and the movable portion of the gland.

In practice it is found that if the fixed portion is carefully adjusted on the shaft a very small movement of the movable portion of the gland occurs, and this movement is permitted by the compression and expansion of the annular buffer which at the same time forms a fluid tight joint between the machine casing and the movable portion of the gland.

In one form of the invention the movable portion of the gland is maintained co-axial with the shaft by means of a guide which, while allowing axial movement, does not permit said movable portion to come in contact with the shaft. In another form an annular groove is formed in the casing of the machine in which one end of a rubber ring is placed, another annular groove being formed in the movable portion of the gland to receive the other end of the rubber ring, the latter being made of sufficiently stout section to support the weight of the gland.

The liquid required for sealing the gland is supplied to an annular channel in the movable portion of the gland from whence it is distributed over the cooperating radial faces of the gland through ducts.

Figure 1:
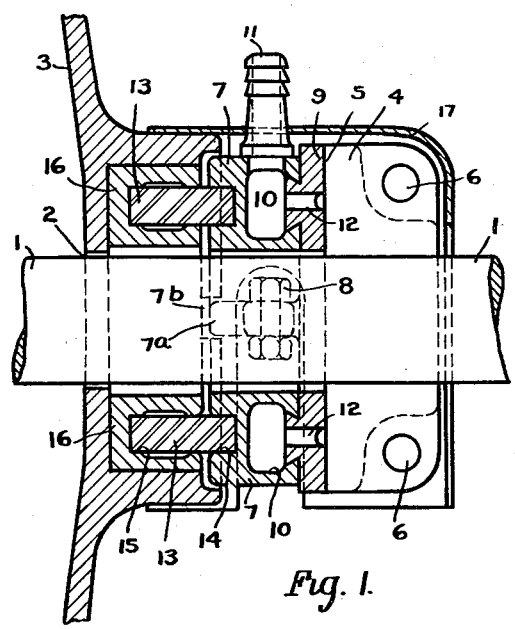
Figure 2:
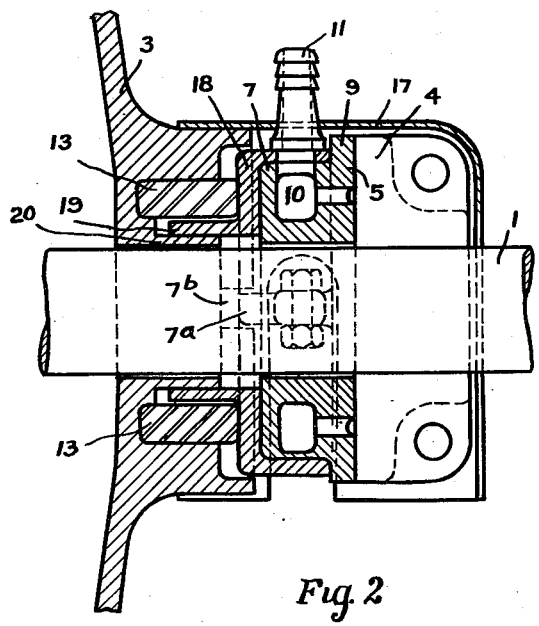

In the accompanying drawing Fig. 1 is a sectional elevation illustrating a liquid sealed gland constructed in accordance with the present invention. Fig. 2 is a similar view showing a modification.

A rotating shaft 1 passes loosely through an orifice 2 provided in the machine casing 3 which may be, for example, that of an air or vacuum pump. Secured to the shaft 1 and rotatable therewith is a flange or collar 4 provided with a radial contact face 5. Said collar is conveniently formed in two parts clamped to the shaft by bolts passing through orifices in the two halves indicated at 6. 7 is an annular member hereinafter termed a gland ring loosely surrounding the shaft and conveniently formed in two halves united by bolts as indicated at 8. Said gland ring is prevented from rotating with the shaft by projecting lugs 7ª on each side which engage in corresponding recesses 7ᵇ in a boss or projection from the machine casing 3 and is provided with a radial contact face 9 which is preferably formed of a hard non-metallic material, lignum-vitæ for example, adapted to cooperate with the contact face 5 of the flange 4. The gland ring has an internal cavity 10 to which a supply of sealing liquid is furnished through the pipe 11 and which communicates by a suitable number of ports 12 with the contact surface 9 so that sealing liquid can be supplied between the contact surfaces of the gland ring and the rotary flange. The gland ring is capable of a suitable amount of axial movement with reference to the casing 3 and in the arrangement shown in Fig. 1 is supported by an annular buffer 13 of elastic material such as rubber which is made of sufficiently stiff section to support the weight of the ring. For this purpose one end of the annular buffer is received in a groove 14 in the gland ring 7 and the other end is received in an annular recess 15 provided in a bushing 16 secured in the casing 3. The annular buffer 13 is sufficiently elastic to permit small axial movements of the gland ring 7 with reference to the casing 3 and at the same time acts to prevent fluid from entering or leaving the space within the casing along the shaft and between the gland ring 7 and the radial face of the bushing 16. A shield 17 may be provided secured to the casing for the purpose of preventing splashing of any sealing liquid which may be discharged from between the contact surfaces 5 and 9. The bushing 16 may if desired be dispensed with and the recess 15 for receiving the end of the buffer 13 will then be provided in the boss or projection from the casing 3.

In Fig. 2 the gland ring 7 is supported from the casing by means of a guide 18, one part of which is formed to receive said gland ring and which is provided with an annular projection 19 adapted to slide on a corresponding annular projection 20 from the casing. The elastic buffer 13 in this case does not in any way support the gland ring but is enclosed between a radial face of the guide 18 and the casing 3 so as to form a fluid-tight joint.

A gland constructed in the manner shown and described may be used as a thrust block when a certain amount of flexibility is required.

In some cases it may be found advisable to have the rubber or elastic ring 13 moulded to such a section as will give the greatest amount of elasticity possible. In other cases a rubber buffer of bobbin section may be employed, additional elasticity being imparted by means of suitable springs.

Although the invention is illustrated as applied to the shaft of a rotary air or vacuum pump it is not limited in this respect but is applicable to other rotating shafts where liquid sealed glands are employed.

Having now particularly described and ascertained the nature of our said invention and in what manner the same is to be performed, we declare that what we claim is:—

1. A gland for sealing the joint between relatively rotatable members comprising a collar provided on one member and having a contact face, a gland movable axially with respect to the collar and having a contact face cooperating with the contact face on the collar, said movable gland having a hollow interior for containing sealing liquid, ducts provided in the gland for conveying the sealing liquid from the interior of the gland to the contacting faces, a port communicating with the hollow interior for supplying sealing fluid thereto, said hollow interior forming a chamber entirely within the gland and closed except for said ducts and port, and resilient means for holding the gland in engagement with the collar.

2. A liquid sealing gland for a rotating shaft and a stationary member comprising a flange on the shaft having a contacting face, a gland surrounding the shaft and having a contacting face cooperating with the face of the flange, said gland being movable axially with respect to the collar and having a hollow interior for the storage of sealing liquid, a plurality of passages provided in the gland for conveying sealing liquid to the contacting faces, a port communicating with the hollow interior for supplying sealing fluid thereto, said hollow interior forming a chamber entirely within the gland and closed except for said openings and port, and means for resiliently supporting the gland upon the stationary member, said resilient supporting means being imperforate and extending from the stationary member to the gland to form a fluid-tight closure therebetween.

3. A liquid sealing gland for a rotating shaft and a stationary member comprising a flange on the shaft having a contacting face, a gland surrounding the shaft and having a contacting face cooperating with the face of the flange, said gland being movable axially with respect to the flange and having a hollow interior for containing sealing liquid, openings provided in the gland for conveying sealing liquid to the contacting faces, a port communicating with the hollow interior for supplying sealing fluid thereto, said hollow interior forming a chamber entirely within the gland and closed except for said openings and port, and resilient means interposed between the stationary member and the gland for holding the gland in contact with the collar.

4. A liquid sealing gland for a rotating shaft and a stationary member comprising a flange on the shaft having a contacting face, a gland surrounding the shaft and having a contacting face cooperating with the face of the flange, said gland being movable axially with respect to the flange and having a hollow interior for containing sealing liquid, openings provided in the gland for conveying sealing liquid to the contacting faces, a port communicating with the hollow interior for supplying sealing fluid thereto, said hollow interior forming a chamber entirely within the gland and closed except for said openings and port, and resilient means interposed between the stationary member and the gland for holding the gland in contact with the collar, said resilient means being imperforate and extending from the stationary member to the gland to form a fluid-tight closure therebetween.

In testimony whereof, I have hereunto subscribed my name this eleventh day of December, 1919.

ARTHUR EDWIN LEIGH SCANES.

In testimony whereof, I have hereunto subscribed my name this nineteenth day of December, 1919.

THOMAS BRIGHOUSE.